United States Patent [19]

Hawkins

[11] Patent Number: 4,532,530

[45] Date of Patent: Jul. 30, 1985

[54] BUBBLE JET PRINTING DEVICE

[75] Inventor: William G. Hawkins, Webster, N.Y.

[73] Assignee: Xerox Corporation, Stamford, Conn.

[21] Appl. No.: 588,166

[22] Filed: Mar. 9, 1984

[51] Int. Cl.[3] .......... G01D 15/18

[52] U.S. Cl. .......... 346/140 R

[58] Field of Search .......... 346/140 R

[56] References Cited

U.S. PATENT DOCUMENTS

| | | | |
|---|---|---|---|
| 4,251,824 | 2/1981 | Hara et al. | 346/140 R |
| 4,410,899 | 10/1983 | Haruta et al. | 346/140 R |
| 4,412,224 | 10/1983 | Sugitani | 346/1.1 |
| 4,429,321 | 1/1984 | Matsumoto | 346/140 |
| 4,458,256 | 7/1984 | Shirato | 346/140 |

*Primary Examiner*—Joseph W. Hartary

*Attorney, Agent, or Firm*—Robert A. Chittum

[57] ABSTRACT

A carriage type, bubble jet ink printing system having improved bubble generating resistors that operate more efficiently and consume lower power, without sacrificing operating lifetimes. The resistor material is heavily doped polycrystalline silicon which can be formed on the same process lines with those for integrated circuits to reduce equipment costs and achieve higher yields. Glass mesas thermally isolate the active portion of the resistor from the silicon supporting substrate and from the electrode connecting points, so that the electrode connection points are maintained relatively cool during operation. A thermally grown dielectric layer permits a thinner electrical isolation layer between the resistor and its protective, ink interfacing tantalum layer, thus increasing the thermal energy transfer to the ink.

11 Claims, 6 Drawing Figures

BUBBLE JET PRINTING DEVICE

BACKGROUND OF THE INVENTION

1. Field of the Invention

This invention relates to bubble jet ink printing systems and more particularly to a bubble jet ink priting device having an improved bubble generating means.

2. Description of the Prior Art

Generally speaking, ink jet printing systems can be divided into two types; viz, continuous stream and drop-on-demand. In continuous stream ink jet systems, ink is emitted in a continuous stream under pressure through at least one orifice or nozzle. The stream is perturbed, so that the stream breaks up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is to not formed or expelled unless it is to be placed on the recording medium.

Since drop-on-demand systems require no ink recovery, charging or deflection, the system is much simpler than the continuous stream type. There are two types of drop-on-demand ink jet systems. The major components of one type of drop-on demand system are an ink filled channel or passageway having a nozzle on one end and a piezoelectric transducer near the other end to produce pressure pulses. The relatively large size of the transducer prevents close spacing of the nozzles and physical limitations of the transducer result in low ink drop velocity. Low drop velocity seriously diminishes tolerances for drop velocity variation and directionality, thus impacting the systems ability to produce high quality copies. The drop-on-demand systems which use piezoelectric devices to expel the droplets also suffer the disadvantage of a slow printing speed.

The bubble jet concept is the other drop-on-demand system, and it is very powerful because it produces high velocity droplets and allows very close spacing of nozzles. The major components of the second type of drop-on-demand system are an ink filled channel having a nozzle on one end and a heat generating resistor near the nozzle.

As the name suggests, printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. The process is ready to start all over again as soon as hydrodynamic motion of the ink stops. With the introduction of a droplet ejection system based upon thermally generated bubbles, commonly referred to as the "bubble jet" system, the drop-on-demand ink jet printers provide simpler, lower cost devices than their continuous steam counterparts and yet have substantially the same high speed printing capability.

The operating sequence of the bubble jet system starts with a current pulse through the resistive layer in the ink filled channel, the resistive layer being near the orifice or nozzle for that channel. Heat is transferred from the resistor to the ink. The ink becomes superheated (far above its normal boiling point) and for water based ink, finally reaches the critical temperature for bubble nucleation of around 280° C. Once nucleated, the bubble or water vapor thermally isolates the ink from the heater and no further heat can be applied to the ink. The bubble expands until all the heat stored in the ink in excess of the normal boiling point diffuses away or is used to convert liquid to vapor which, of course, removes heat due to heat of vaporization. The expansion of the bubble forces a droplet of ink out of the nozzle. Once the excess heat is removed, the bubble collapses on the resistor. The resistor at this point is no longer being heated because the current pulse has passed and, concurrently with the bubble collapse, the droplet is propelled at a high rate of speed in a direction towards a recording medium. The resistive layer encounters a severe cavitational force by the collapse of the bubble which tends to erode it. The ink channel then refills by capillary action. The entire bubble formation and collapse sequence occurs in about 10 microseconds. The channel can be refired after 100 to 500 microseconds minimum dwell time to enable the channel to be refilled and to enable the dynamic refilling factors to become somewhat dampened.

Investigation and experimentation have revealed that the bubble jet concept of the prior art encounters a critical problem of resistive layer lifetime because of inefficient thermal heat transfer to the ink, requiring higher temperatures in the resistive layer, as well as because of the cavitational forces during the bubble collapse. The lifetime of the resistive layer, of course, determines the useful life of the bubble jet ink printing device. The present invention overcomes this resistive layer wear and shortened operating lifetime by providing a more efficient, lower power consumming bubble generating means as will be more fully discussed below.

One of the most widely used prior art structures for a bubble generating means 50 for a typical bubble jet ink printing device, such as like one depicted in FIG. 1, is shown in FIG. 5. It is a layered, resistive thin film device having a support structure 51 which must have a high thermal conductivity. The support structure is generally silicon or a ceramic material such as aluminum oxide ($Al_2O_3$). An underglaze layer 52 of sputtered silicon dioxide ($SiO_2$) is placed on the support structure having a thickness of 2 to 5 microns. A resistive material such as zirconium boride ($ZrB_2$), is sputtered on the underglaze to form resistor 53. The thick $SiO_2$ underglaze is necessary to allow some thermal isolation between the thermally conductive substrate and the resistor. The underglaze has poor thermal conductivity compared to the substrate. An unattractive feature of the underglaze is that the contact between the resistor and electrical leads also gets hot because the contact area is thermally isolated as well. The resistor is connected to external drive electronics (not shown) by aluminum leads 54. A 0.5 micron sputtered $SiO_2$ film 55 is used to dielectrically isolate the resistor 53 and the aluminum leads 54 from the conductive ink which is contained in the channel 56 of channel plate 57 shown in dashed lines. A one micron tantalum (Ta) layer 58 is sputter deposited on the resistor. The purpose of the Ta layer 58 is for the protection of the $SiO_2$ film from damage from the bubble collapses. The $SiO_2$ film is attacked quite readily by heat and cavitational forces generated by the collapsing bubble.

The structure of the bubble generating means 50 is considered adequate but quite expensive to manufacture and is inefficient in operation. The $SiO_2$ film 55 is too thick to allow efficient heat transfer from the resistor 53 to the Ta layer 58. The thickness of the $SiO_2$ film is mandated by the need for good dielectric isolation. It is well known in the industry that production of thin sputtered $SiO_2$ films having thicknesses of less than 5000 angstrom (Å) with good integrity is not easily achieved at high yield, especially since the $SiO_2$ film must cover a step at the edge of the resistor. To bring the yield up to commercially acceptable percentages, the thickness must be increased. Another important shortcoming of the prior art design is that active drive devices cannot be easily integrated on the support structure 51 without the addition of many process steps that necessitate enlarging the size of the printing head containing the array of bubble jets. Increased process steps increase cost, while compact printing heads, especially those for carriage printers, is highly desirable.

U.S. Pat. No. 4,251,824 to Hara et al discloses a bubble jet drop-on-demand system. FIG. 7A and 7B therein show a single resistive layer for each nozzle. Thermal energy is applied to the ink by the resistive layer to bring about the change in state of the ink to develop bubbles and discharge droplets from the nozzle for recording.

U.S. Pat. No. 4,410,899 to Haruta et al discloses a method of expelling a droplet by producing and eliminating a bubble in the ink passageway in such a way that the maximum bubble volume does not block the ink flow in the passageway.

U.S. Pat. No. 4,412,224 to Sugitani discloses a method for forming the ink channels in the bubble jet printing head by a "photo-forming" technique directly on the substrate having the circuitry and resistive layers.

The prior art bubble jet devices provide close spacing of ink channels and generation of high velocity droplets so that high speed and high resolution printing is possible. The disadvantages of prior art devices are that they require an expensive manufacturing technique and that they provide an inefficient use of the thermal energy. If the bubble jet could be made more thermally efficient, then inexpensive MOS type circuitry (N-MOS) can be used to drive the head instead of the more expensive bipolar circuitry. It is, of course, desirable and cost effective to have a resistor structure which is immediately and simply integrated and the same wafer with MOS drive electronics, preferably without additional process steps. As will be seen below, these improvements form the basis of the present invention.

SUMMARY OF THE INVENTION

It is an object of the present invention to provide an improved bubble generating circuit for a bubble jet ink printing system.

It is another object of this invention to provide a bubble generating circuit having a more efficient, lower power consuming bubble generating resistive device.

It is still another object of this invention to provide a bubble jet printing head that is more cost effective to manufacture and that allows drivers and logic circuits to be co-fabricated in the same steps.

In the present invention, an improved bubble jet printing head is mounted on a carriage adapted for reciprocating motion across the surface of a recording medium, such as paper. The paper is stepped a predetermined distance each time the printing head's direction is reversed to print another line. The printing head comprises a linear array of parallel channels having nozzles on the ends confronting the paper and each opening into a common manifold at the other end of the channel. The channels and manifold is filled with ink and the ink is replenished as it is used from an ink supply via hose to a hose connector located in a passageway to the manifold. Individually addressable resistors are formed in each channel near its associated nozzle. Current pulses are selectively applied to the resistors from a controller in response to receipt by the controller of digitized data signals.

The current pulses cause the resistors to transfer thermal energy to the ink which, as is well known in the prior art, vaporizes the ink and produces a bubble. The resistor cools after the passage of the current and the bubble collapses. The nucleation and expansion of the bubble forms a droplet and propels it towards the paper.

The printing head contains improved highly doped polysilicon bubble generating resistors which are more compatible with the integrated circuit process so that they are more cost effective to manufacture and the improved resistors have a long operating lifetime. Two main features of the improved resistor construction are that the electrodes or leads and their connection point to the resistor are maintained relatively cool and a thinner dielectric layer between the resistive material and the protective tantalum layer enables very efficient transfer of the thermal energy from the resistor to the tantalum and thus to the ink. An alternate embodiment of the resistor construction uses buried contacts to a metallized layer on the bottom of the main substrate for a common return. Such a structure greatly reduces crosstalk between adjacent resistors.

DESCRIPTION OF THE PREFERRED EMBODIMENT

Figure 1:
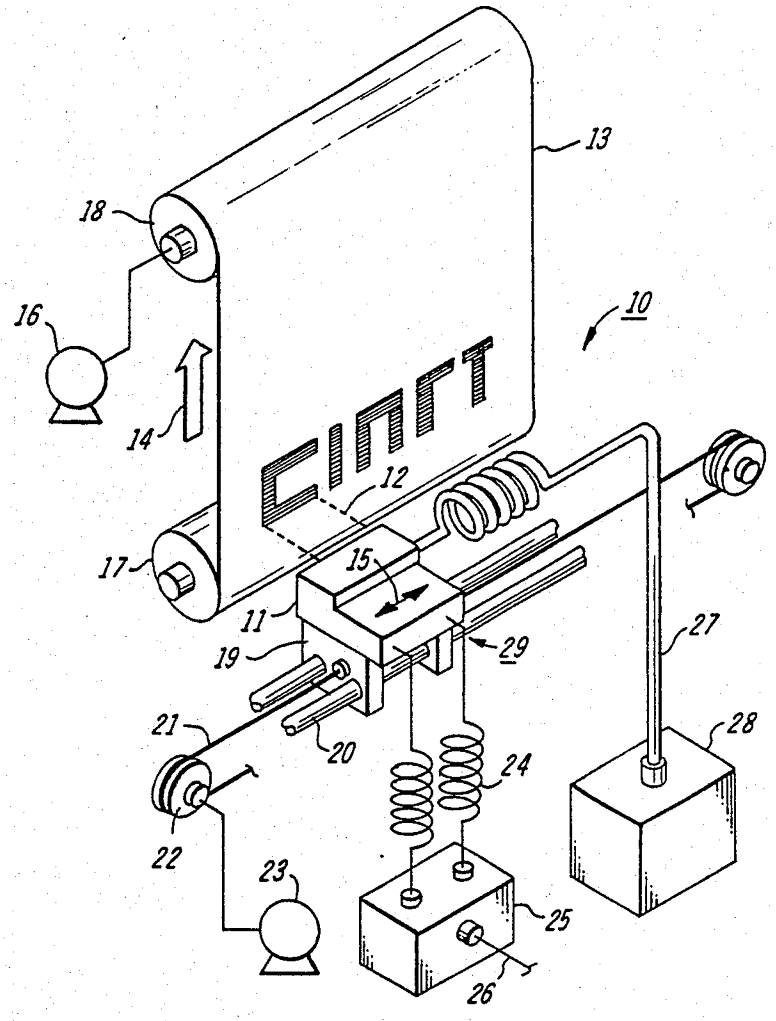
FIG. 1 is a schematic perspective view of a carriage type bubble jet ink printing system incorporating the present invention.

The bubble generating structure 40 of the present invention is shown in FIG. 4. The substrate 41 is silicon. Silicon is electrically insulative, but has good thermal conductivity for the removal of heat. The substrate 41, however, can be processed in the following ways: lightly doped, for example, to a resistivity of 5 ohm-cm; degenerately doped to a resistivity between 0.01 to 0.001 ohm-cm to allow for a current return path; or degenerately doped with an epitaxial, lightly doped surface layer 2 to 25 microns thick to allow fabrication of active field effect or bipolar transistors. In the preferred embodiment, an underglaze layer 42 of thermal oxide such as $SiO_2$ is placed on the substrate 41 having a thickness of approximately 7000 Å, though the underglaze layer could vary between 5000 Å and one micron. A reflowed chemical vapor deposited glass mesa 43 about 1 to 2 microns thick and containing 5 to 8 percent phosphorus is positioned on the underglaze layer where the resistors 44 are to be subsequently placed.

The resistive material which forms the resistor 44 is degenerately doped polycrystalline silicon which is preferably deposited by chemical vapor deposition (CVD). The doping can be "n" or "p" type, but, in the preferred embodiment, is "n"-type. The doping is achieved either during deposition or subsequently by means such as, for example, ion implantation or diffusion. The resistor material may be 1000 to 6000 angstrom (Å) thick; however, in the preferred embodiment it is between 5000 and 6000 Å thick. The polysilicon can simultaneously be used to form elements of associated active circuitry, such as, gates for field effect transistors and other first layer metallization.

The polysilicon resistors 44 are subsequently oxidized in steam or oxygen at a relatively high temperature of about 1000° C. for 50 to 80 minutes to convert a small fraction of the polysilicon to $SiO_2$. In the preferred embodiment, the resistors were thermally oxidized around 50 minutes to achieve a $SiO_2$ dielectric layer 45 of about 1000 Å. Because the overglaze is grown from the resistor, instead of being deposited, the layer can be much thinner, such as 500 Å to 1 micron and yet have good integrity. The preferred thickness range is 1000 to 2000 Å. Alternatively, pyrolitic chemical vapor deposited $Si_3N_4$ can be used as a dielectric isolation layer in the same thickness range, but this is not preferred since patterning it is a more complex step than thermal oxidation of the resistor.

A tantalum (Ta) layer 46 for the protection of the dielectric layer 45 of about 1 micron thick is deposited on the oxidized silicon or dielectric layer 45 over the resistor 44, care being taken to be sure that the outer surface of the dielectric layer 45 remains clean prior to deposition of the Ta layer. The Ta layer is etched off, except over the portion of the resistor 44 which resides over the glass mesa 43, using $CF_4/0_2$ plasma etching. The underglaze oxide layer 42 is etched off of opposing edges of the polysilicon resistors 44 for the attachment of electrical leads. Aluminum leads 47 are deposited on the underglaze layer 42 and over the edges of the polysilicon resistors 44 which have been cleared of oxide. The leads are patterned to allow contact with other circuitry and is deposited to a thickness of 0.5 to 3.0 microns. The preferred thickness is 1.5 microns.

For lead passivation, a 2 micron thick phosphorus doped CVD $SiO_2$ film 48 is deposited and subsequently etched off of the lead contact points for connection with the other circuitry and the Ta layer 46 which forms the bubble generating area. This etching may be by either the wet or dry etching method. Alternatively, the lead passivation may be accomplished by plasma deposited $Si_3N_4$.

The advantages of the above invention structure are threefold. First, it can be manufactured on the same process line with integrated circuits to reduce equipment costs and achieve high yields. Second, the glass mesa 43 provides the appropriate thermal insulating thickness between the silicon substrate 41 and permits the lead 47 interconnect region with the resistor 44 to rest on the underglaze layer 42 where it may be kept relatively cool. The thickness of the underglaze is thin enough, even though it has a low thermal conductivity, to keep the resistor-lead interface from exceeding around 200° C. In addition, the leads 47 are placed on the thin underglaze layer 42 so that the heat cannot be conducted from the resistor 44 to the leads at a rate which will heat them up. Finally, the $SiO_2$ dielectric layer 45 between the resistor 44 and the Ta layer 46 is relatively thin and yet has excellent integrity. This allows highly efficient heat transfer from the resistor 44 to the Ta layer 46. For Example, when 600 nm thick layer of $SiO_2$ is placed between the resistor an Ta layer and a 2 $\mu$sec voltage pulse is applied, which is typically the thickness used by prior art devices, the temperature difference between the resistor (600° C.) and the Ta (250° C.) is 350° C. If the $SiO_2$ could be reduced to 100 nm, as is possible in the present invention, the resistor heats to 425° C. while the Ta attains a temperature of 350° C., a difference of only 75° C. Using the same size resistor, the power is reduced from 16 to 10 watt. The resistor material 44 of this invention thus remains cooler and less stress is induced from extreme heating. This important advantage is obtained because thermally grown $SiO_2$ is denser, has better step coverage, and is better adhering than sputtered or CVD $SiO_2$ as used in the prior art bubble generating structures of bubble jet printing devices.

The above-mentioned improved heat generating structure for a bubble jet printing device may be set according to the following working example:

On a clean silicon wafer, form a thermal oxide, such as $SiO_2$, to a thickness of 1000 Å. A reflowed CVD glass containing 5 to 8 percent phosphorus is positioned thereon in thicknesses of 2 microns to form mesas in locations where ultimately the resistive material which forms the resistors will be formed. Next, CVD deposit the polysilicon material over the mesas to a thickness of 6000 Å. The polysilicon material was heavily doped by an ion implant of 90 KeV $10^{16}$ $cm^{-2}$ $p+$ to achieve a n-type doping. Plasma etch the polysilicon material into a linear array of resistor islands. Clean the resistor islands and thermally oxide them at 1050° C. for 60 minutes to achieve a 1000 Å thick $SiO_2$ layer. Open vias in the thermal oxide with a HF wet etch to form paths for the electrical leads from positions on the wafer for connection to other circuitry to the polysilicon resistors. Deposit a one micron thick layer of aluminum with one percent silicon and then pattern the aluminum leads with a wet etch in $H_3PO_4$ at 50° C. temperature. Finally, sinter the wafer having the array of resistors and aluminum leads at 450° C. for 30 minutes in a nitrogen atmosphere.

For the above example, 150 resistors were formed and tested. The resistors had a resistance of $47.2 \pm 1.2$ ohms and no bad devices were found. A wide variety of sheet resistances can be achieved from 1000 ohm/square to 10 ohm/square by ion implantation of boron or phosphorus to accommodate drive voltage and current. In addition, the aluminum could be melted on top of the resistor with no change in resistance characteristics. Since aluminum does not melt until it reaches about 660° C., the $N+$ polysilicon resistors are well suited as heater elements for bubble jet arrays.

In another example, contact was made between the silicon resistor and other circuitry on a similar wafer with silicide leads, such as $TiSi_2$. Such silicide has a very low resistivity (around 10 microohm-cm) and is itself thermally stable to about 800° C. It is also plasma etchable in $CF_4$. The use of silicide as an electrical lead material would allow a reflow glass to be used as a passivation layer over the entire structure because it could be subsequently heat treated.

The use of degenerately doped (phosphorus or boron) polycrystalline silicon as a resistor material offers many advantages over ZrB2 used in the prior art. For example, there is ease of deposition and compatibility with integrated circuit (IC) process lines, thus making fabrication very cost effective. The resistive material and electrical leads may be easily passivated with $SiO_2$ or $Si_3N_4$, either thermally grown or CVD deposited. The resistivity may be controlled from 1000 to 10 ohm per square by diffusion or by ion implantation and the thickness of the resistor may be adjusted between 1500 and 6000 Å. The structure is very stable in high temperatures (up to 800° C.) because of the low diffusion of phosphorus in silicon. Finally, this structure may be fabricated quite readily because of the ease of patterning by plasma etching in $CF_4$ using a photoresist mask.

A typical carriage type bubble jet ink printing device 10 is shown in FIG. 1. A linear array of droplet producing bubble jet channels is housed in the printing head 11 of reciprocating carriage assembly 29. Droplets 12 are propelled to the recording medium 13 which is stepped by stepper motor 16 a preselected distance in the direction of arrow 14 each time the printing head traverses in one direction across the recording medium in the direction of arrow 15. The recording medium, such as paper, is stored on supply roll 17 and stepped onto roll 18 by stepper motor 16 by means well known in the art.

The printing head 11 is fixedly mounted on support base 19 which is adapted for reciprocal movement by any well known means such as by two parallel guide rails 20. The printing head and base comprise the reciprocating carriage assembly 29 which is moved back and forth across the recording medium in a direction parallel thereto and perpendicular to the direction in which the recording medium is stepped. The reciprocal movement of the head is achieved by a cable 21 and a pair of rotatable pulleys 22, one of which is powered by a reversible motor 23.

The current pulses are applied to the individual bubble generating resistors in each ink channel forming the array housed in the printing head 11 by conduits 24 from controller 25. The current pulses which produce the ink droplets are generated in response to digital data signals received by the controller through electrode 26. The ink channels are maintained full during operation via hose 27 from ink supply 28.

Figure 2:
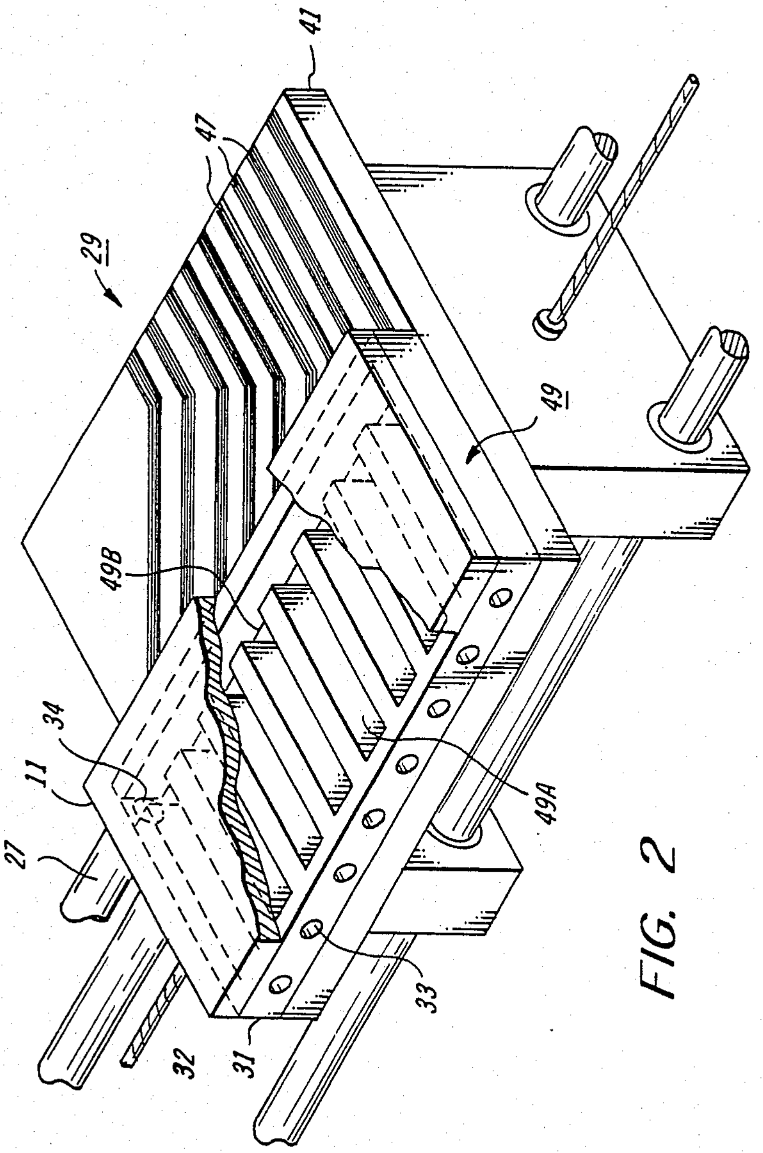
FIG. 2 is an enlarged schematic perspective view of a bubble jet ink printing head of FIG. 1.

FIG. 2 is an enlarged, partially sectioned, perspective schematic of the carriage assembly 29 shown in FIG. 1. The printing head 11 is shown in three parts. One part is the substrate 41 containing the electrical leads 47 and bubble generating resistors 44, not shown in FIG. 2A. Refer to FIG. 4 for detailed resistor construction. The next two parts comprise the channel plate 49 having ink channels **49*a* and manifold 49*b*. Although the channel plate 49 is shown in two separate pieces 31 and 32, the channel plate could be an integral structure. The ink channels 49*a* and ink manifold 49*b* are formed in the channel plate piece 31 having the nozzles 33 at the end of each ink channel opposite the end connecting the manifold 49*b*. The ink supply hose 27 is connected to the manifold 49*b* via a passageway 34 in channel plate piece 31 shown in dashed line. Channel plate piece 32 is a flat member to cover channel plate piece 31 and together form the ink channel 49*a* and ink manifold 49*b* as they are appropriately aligned and fixedly mounted on silicon substrate 41**.

Figure 3:
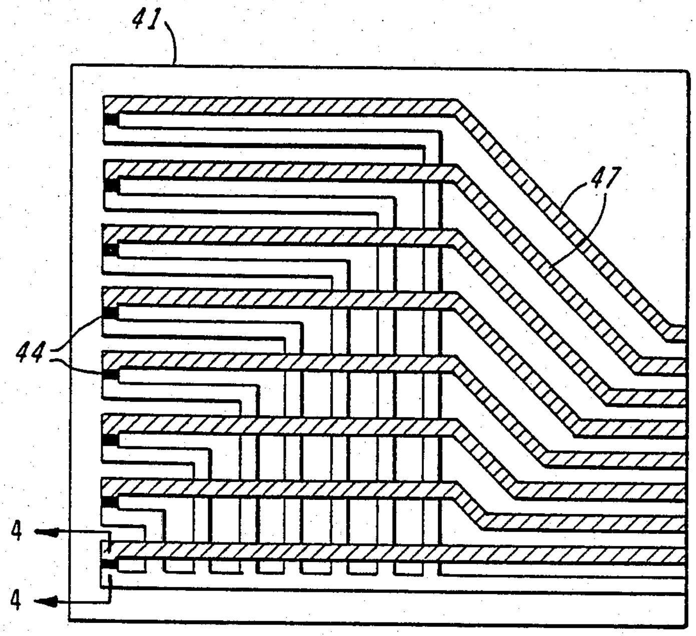
FIG. 3 is a schematic plan view of the bubble generating circuitry for the printing head of FIG. 2.
Figure 5:
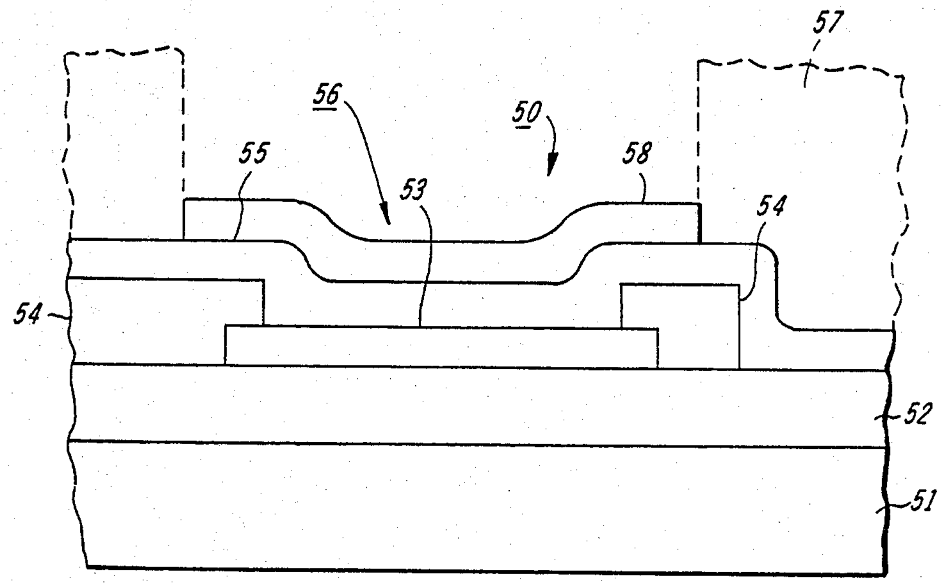
FIG. 5 PRIOR ART
FIG. 5 is an enlarged schematic cross-sectional view of the prior art bubble generating region.
Figure 4A:
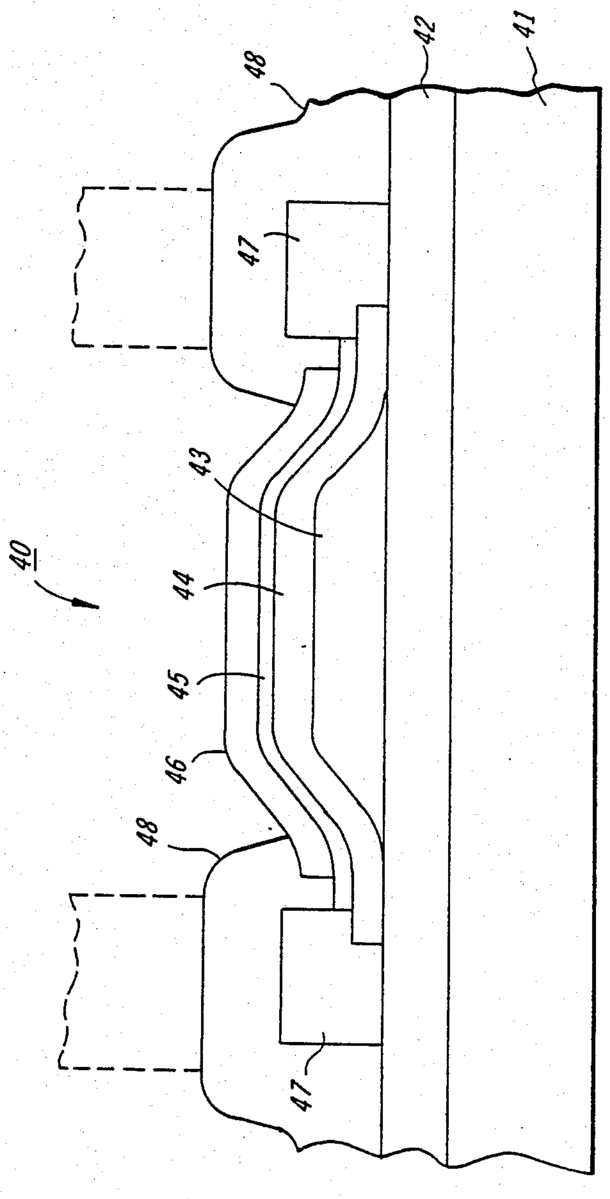
FIG. 4A is an enlarged schematic cross-sectional view of the bubble generating region of the circuitry of FIG. 3 which delineates the present invention.

FIG. 3 is a schematic plan view of the substrate 41 showing the resistors 44 and aluminum leads 47 in one configuration suitable for use as a bubble generating design with the channel plate 49 removed for clarity. FIG. 4A is a cross-section of a one of the resistors 44 as depicted by the section indication "4—4" in FIG. 3.

In the prior art, such as is disclosed in FIG. 7A of U.S. Pat. No. 4,251,824, a common aluminum lead is frequently used along the front of the resistor array. The width of the common lead spaces the resistors from their associated nozzle. If the distance is too far, the velocity of the exiting ink droplet is affected and the droplet speed lowered. Among other things, a relatively low speed droplet velocity means the recording medium must be closer to the nozzle array, thus affecting printer dimensional design latitudes. When the number resistors is high, the common lead becomes a problem because the lead resistance becomes substantial. This generally means a wider common return and spaces the resistors a longer distance from the nozzle.

Figure 4B:
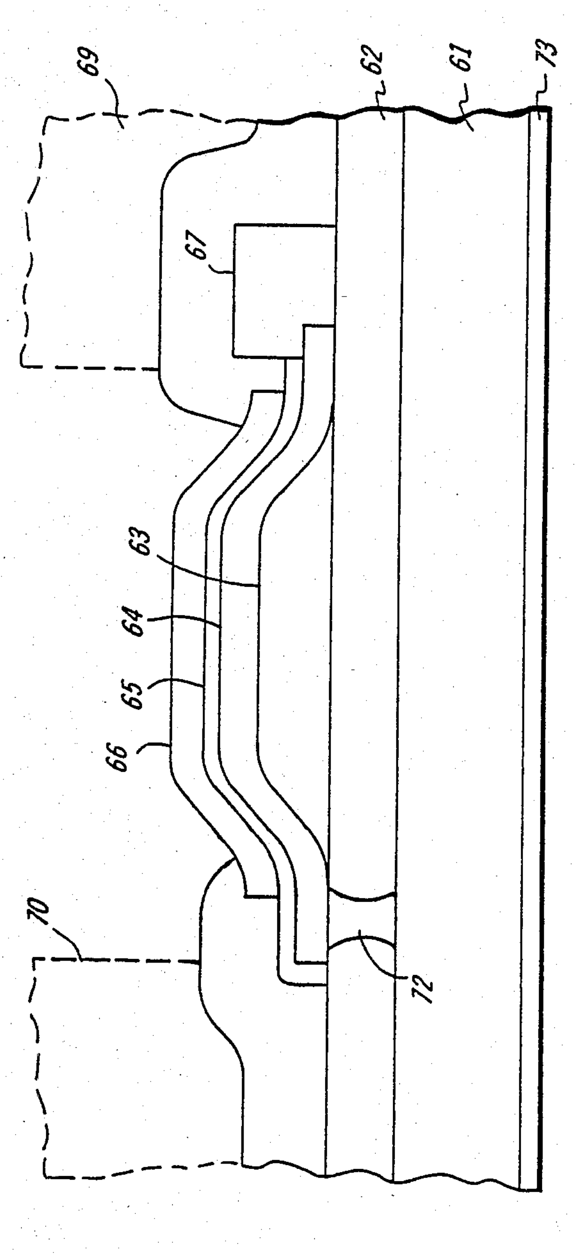
FIG. 4B is an enlarged schematic cross-sectional view of an alternate embodiment of the bubble generating region of FIG. 4A.

The alternate embodiment of the present invention is shown in FIG. 4B. A highly doped, conductive substrate 61 is used, such as 0.01 ohm-cm antimony doped silicon or 0.001 ohm-cm boron doped silicon. A thin, lightly doped P-type epitaxial surface layer 62 having a thickness of 5000 to 8000 Å, such as 0.1 to 10 ohm-cm, can be used on top of the substrate 61, the substrate being n+. Buried contacts 72 through the epitaxial layer 62 are made to the substrate 61 with phosphorus diffusion, allowing fabrication of N-MOS circuitry in the p-type epitaxial layer. The back of the substrate 61 is metallized with a 0.5 to 3 micron layer 73 of aluminum to allow a low resistance return path.

A reflowed CVD glass mesa 63 containing 5 to 8 percent phosphorus is positioned where the resistors 64 are to be subsequently placed. The resistive material which forms the resistor 64 is degenerately doped polycrystalline silicon which is CVD deposited. The resistive material is doped N-type, though the doping of the resistor could be p-type if the doping in the other layers was changed to be compatible. As described in the embodiment of FIG. 4A, the doping is achieved either during deposition or subsequently by means such as, for example, ion implantation or diffusion. The resistor material may be 1000 to 6000 Å thick, but is preferably between 5000 and 6000 Å thick.

The polysilicon resistors 64 are subsequently oxidized in steam or oxygen at around 1000° C. for 5 to 80 minutes to convert a small fraction of the polysilicon to $SiO_2$ dielectric layer 65 of about 1000 Å thick. A Ta layer 66 is deposited over the thermally oxidized layer 65 to a thickness of about 1 micron. The Ta layer 66 is etched off except over the portion of the resistor 64 which resides over the glass mesa 63, using $CF_4/O_2$ plasma etching. The thermally oxidized layer 65 is etched off one edge portion of the polysilicon resistor 64 for the attachment of a single electrical lead 67. Single aluminum leads 67 are deposited on the epitaxial layer 62 and over the edge of the polysilicon resistors 64 which have been cleared of oxide. The leads are patterned to allow contact with other circuitry to a preferred thickness of 1.5 microns, though the thickness could vary from 0.5 to 3.0 microns. The leads are passivated with a 2 micron thick phosphorus doped CVD $SiO_2$ film 68. Channel plate 69 shown in dashed line, is fixedly mounted and sealed to the processed substrate 61 after the leads 67 are passivated. The channel plate is aligned so that the channel plate walls 70 form channels which straddle the resistors 64.

In addition to eliminating the problem of the common return of the prior art bubble jet printers which prevent the bubble generating resistors from being optimally positioned relative to the nozzles, the substrate current return allows many adjacent channels to be pulsed or fired without crosstalk between adjacent resistors.

The above described carriage-type bubble jet ink printing device with the improved bubble generating resistors of FIGS. 4A and 4B operate in a manner well known in the art, as described earlier, but have a more cost effective construction, are more thermally efficient, and have lower power consuming resistors than those of the prior art, while having at least equally long operating lifetimes. Further, a bubble jet ink printing device having the improved resistor structure of FIG. 4B has the added advantage of dramatic crosstalk reduction between resistors.

In recapitulation, the present invention relates to an improved bubble jet ink printing system having bubble generating resistors that have long operating lifetimes. The resistors can be manufactured on the same process lines with those for integrated circuits to reduce equipment costs and achieve high yields. The glass mesa structures allows the contact points of the polysilicon resistors with the aluminum leads to be placed on the relatively thin $SiO_2$ underglaze layer so that the heat at these locations may be more readily conducted to the silicon substrate having a high thermal conductivity and thus cool the aluminum leads. Also, the relatively thin, thermally grown $SiO_2$ dielectric layer between the resistor and protective tantalum layer provides for more efficient bubble generation by more effective heat transfer to the tantalum and therefore the ink and visa versa. In one configuration, the resistor common return is via buried contacts to a metallized layer on the bottom of the wafer substrate, so that crosstalk between resistor is dramatically reduced.

Many modifications and variations are apparent from the foregoing description of the invention and all such modifications and variations are intended to be within the scope of the present invention.

I claim:

1. An improved bubble jet ink printing device having a plurality of bubble generating resistors for the production and propulsion of ink droplets towards a recording medium comprising:

a supply of ink;

a channel plate having recesses therein which form a linear array of parallel channels, one end of each channel opening into a common manifold and the other end of each channel terminating with a nozzle, the manifold having a passageway to receive ink from the ink supply;

a dielectric substrate on which the channel plate is fixedly mounted for forming a printing head having a closed system for the containment of the ink, the system being open only through the nozzles;

means for adding and replenishing ink from the ink supply to the printing head via the manifold passageway;

bubble generating resistors being formed on the dielectric substrate prior to the mounting of the channel plate and in locations which place one resistor in each channel after the channel plate is mounted and near the nozzle associated with that channel, the resistor material being doped polycrystalline silicon, electrodes being patterned on the dielectric substrate for carrying electric current to and from the resistors, a relatively thin dielectric isolation layer having good integrity being produced on the resistor, a protective layer being formed on the dielectric isolation layer to protect it from the cavitational forces of collapsing bubbles of ink vapor, and an overcoat layer being formed over the electrodes to prevent electrical contact between electrodes and between the electrodes and the ink; and means for applying current pulses to selected electrodes and associated resistors in response to digitized data signals to generate thermal energy in said resistors which is transferred through the isolation and protective layers to said ink to produce bubbles of ink vapor, so that concurrently with the passage of the current pulse through the resistor, the bubble expands and expels an ink droplet from the nozzle, propelling the droplet towards the recording medium.

2. The bubble jet ink printing device of claim 1 further comprising mesas of dielectric material being deposited on the dielectric substrate, when said dielectric substrate is thermally conductive, on which the polycrystalline silicon resistors are formed, the portion of the resistor on its associated mesa being the active portion for applying thermal energy through the isolation and protective layers to the ink, and said isolation layer being formed on the active portion of the resistor, the resistor portion extending beyond the mesa and onto the dielectric substrate being for connection of the electrode, so that these connection points and the electrodes may readily conduct heat to the dielectric substrate and remain relatively cool while maintaining efficient transfer of the thermal energy to the ink during the application of the dielectric current pulses to selective electrodes and associated resistors.

3. The bubble jet ink printing device of claim 2, wherein the dielectric substrate material is silicon, the polycrystalline silicon resistors are degenerately doped, the mesa material is phosphorus doped glass, the overcoat layer material is CVD glass, and the protective layer is tantalum.

4. The bubble jet ink printing device of claim 3, wherein the isolation layer is thermally grown $SiO_2$, and further comprising a relatively thin $SiO_2$ underglaze layer being formed on the substrate prior to the deposition of the glass mesa.

5. The bubble jet ink printing device of claim 4, wherein the printing head is mounted on a support base to form a carriage assembly, the support base being adapted for reciprocal movement parallel to the surface of the recording medium and perpendicular to the direction of movement thereof; wherein the nozzles are equidistant from and confront the recording medium surface; an wherein said printing device further comprises:

means for stepping the recording medium a predetermined distance from a stationary position each time the carriage assembly completes a traversal in one direction across the recording medium, so that the printing head may print one line at a time for each carriage assembly traversal.

6. The bubble jet ink printing device of claim 5, wherein the thermally grown $SiO_2$ layer is 500 to 2,000 angstrom thick, so that the thermal energy generated in the resistor is efficiently transferred to the tantalum layer and the temperature difference between the tantalum layer and the resistor is less than 100° C.

7. The bubble jet ink printing device of claim 6, wherein the resistor and electrode connection points are located on the underglaze layer, so that the temperature of the electrodes and resistor connection points do not exceed 200° C.

8. The bubble jet ink printing device of claim 4, wherein the thickness of the $SiO_2$ underglaze layer is between 5000 angstrom and one micron; wherein the glass mesas contain 5 to 8 percent phosphorus and is between 1 and 2 microns thick; and wherein the resistors' doping is n type with a thickness of 1000 to 6000 angstrom.

9. The bubble jet ink printing device of claim 8, wherein the tantalum layer is about one micron thick, and wherein the glass passivating overcoat for the electrodes is about 2 microns thick.

10. A carriage type, bubble jet, ink printing device having a plurality of improved bubble generating resistors for the production and propulsion of ink droplets towards a movable recording medium comprising:

a supply of ink;

a printing head adapted for reciprocal movement parallel to the surface of the recording medium and perpendicular to the direction of movement thereof, the printing head having a linear array of parallel channels which rest on a highly doped, electrically and thermally conductive silicon substrate, one end of each channel opening in a common manifold and the other end of each channel terminating with a nozzle, said nozzles confronting the recording medium and each being equidistant therefrom, and the manifold being connected to the ink supply;

means for replenishing ink as it is emitted through the printing head nozzles from the ink supply;

said bubble generating resistors being formed in each channel on the printing head substrate at a predetermined distance from its associated nozzle, the resistor material being n-type, degenerately doped polycrystalline silicon formed on deposited mesas of phosphorus doped glass; a lightly doped, p-type, epitaxial layer being formed on the substrate prior to the deposition of the glass mesas; the side of the substrate opposite the one with having the channels and resistors being metallized with a layer of aluminum which serves as a low resistance, common electrical return for all of the resistors; electrically conductive regions being formed through the epitaxial layer by phosphorus diffusion, so that said conductive regions may serve as buried contacts between the resistors and the substrate; the portion of the resistor on the glass mesas being the active portion for transferring thermal energy to the ink, the resistor portion extending beyond the glass mesas being for connecting the resistor to the buried contacts and being for connecting the resistor to the subsequently formed addressing electrodes; a thermally grown silicon dioxide layer being produced on the resistor with electrode connecting point being etched off of one edge of each resistor for the attachment of a single addressing electrode; a tantalum layer being deposited over the thermally grown silicon dioxide layer in order to protect the silicon dioxide layer from the cavitational forces of collapsing bubbles of ink vapor, the tantalum layer being etched off the resistor except for the portions over the glass mesas; electrodes being patterned on the epitaxial layer to conduct electrical current pulses to each of the resistors; and a CVD glass passivating overcoat being formed over the electrodes to prevent contact between the electrodes and the ink; and means for applying current pulses to selected electrodes and their connected resistors in response to digitized data signals to produce serially bubbles of ink vapor on the tantalum layer over the active portion of the resistors concurrently with the passage of each current pulse through the resistors, said current pulse passage through the resistors resulting in the formation of bubbles that expel and propel a droplet of ink toward the recording medium from the nozzles during the expansion of each bubble.

11. The ink printing device of claim 10, wherein the expitaxial layer has a thickness of 5000 to 8000 angstrom; wherein the aluminum layer forming the common return has a thickness of 0.5 to 3 microns; wherein the thermally grown silicon dioxide layer electrically isolates the tantalum layer from the resistor and has a thickness of about 1000 angstrom; wherein the tantalum layer has a thickness of one micron; and wherein the ink printing device further comprises:

means for stepping the recording medium a predetermined distance from a stationary position each time the printing head completes a traversal in one direction across the recording medium, so that the printing head may print one link of ink droplet information for each print head traversal.

* * * * *

UNITED STATES PATENT OFFICE
CERTIFICATE OF CORRECTION

PATENT NO. : 4,532,530

DATED : July 30, 1985

INVENTOR(S) : William G. Hawkins

It is certified that error appears in the above-identified patent and that said Letters Patent are hereby corrected as shown below:

Claim 11, Column 12, line 49, delete "link" and insert --line--

Signed and Sealed this

*Twenty-first* Day of *January 1986*

[SEAL]

*Attest:*

DONALD J. QUIGG

*Attesting Officer*

*Commissioner of Patents and Trademarks*